July 2, 1963  H. BROWNING  3,096,104
FLEXIBLE PIPE LINE FITTING
Filed May 15, 1959  2 Sheets-Sheet 2

INVENTOR
HAROLD BROWNING

BY
*B. L. Zangarl*
ATTORNEYS

United States Patent Office 3,096,104
Patented July 2, 1963

1

3,096,104
FLEXIBLE PIPE LINE FITTING
Harold Browning, Hyattsville, Md., assignor to the United States of America as represented by the Secretary of the Navy
Filed May 15, 1959, Ser. No. 813,604
4 Claims. (Cl. 285—226)
(Granted under Title 35, U.S. Code (1952), sec. 266)

The invention described herein may be manufactured and used by or for the Government of the United States of America for governmental purposes without the payment of any royalties thereon or therefor.

This invention relates to a flexible pipe-line fitting, and more particularly to a pipe-line fitting capable of either separate or combined longitudinal, lateral and angular deflection.

In accordance with prior art practice, most flexible pipe-line fittings consist of corrugated tubular metal members wherein the corrugations extend substantially at right angles only to the longitudinal axis of the coupling and thus are capable of longitudinal deflection only. Thus prior art coupling devices of the instant type are capable of longitudinal deflection only and are either entirely incapable of lateral and/or angular deflection or have very poor strentgh qualities insofar as lateral and/or angular deflection is concerned, being easily subject to either fracture or other failure when subjected to frequent or extreme lateral deflections.

In accordance with the instant invention, a flexible pipe-line coupling is constructed utilizing some of the features of the aforementioned prior art bellows type coupling which is particularly adapted to compensate for longitudinal deflection of pipe-line members, and combines with said structure a modified bellows-like configuration particularly adapted to allow lateral and/or angular pipe-line deflection between connected pipe members so as to obtain an overall, new, novel and inventive coupling capable of both longitudinal and lateral deflection.

It is accordingly an object of this invention to provide a pipe-line coupling adapted to overcome the aforementioned disadvantages of the prior art.

Another object of this invention is to provide a pipe-line coupling adapted to compensate for longitudinal pipe-line deflections.

A further object of this invention is to provide a pipe-line coupling that will allow for lateral and/or angular pipe line deflections.

Still another object of this invention is to provide a pipe-line coupling adapted to compensate for longitudinal angular and/or lateral pipe-line deflections.

Other objects and many of the attendant advantages of this invention will be readily appreciated as the same becomes better understood by reference to the following detailed description when considered in connection with the accompanying drawings, wherein.

Referring now to the drawings wherein like reference characters designate like or corresponding parts through-

Figure 1:
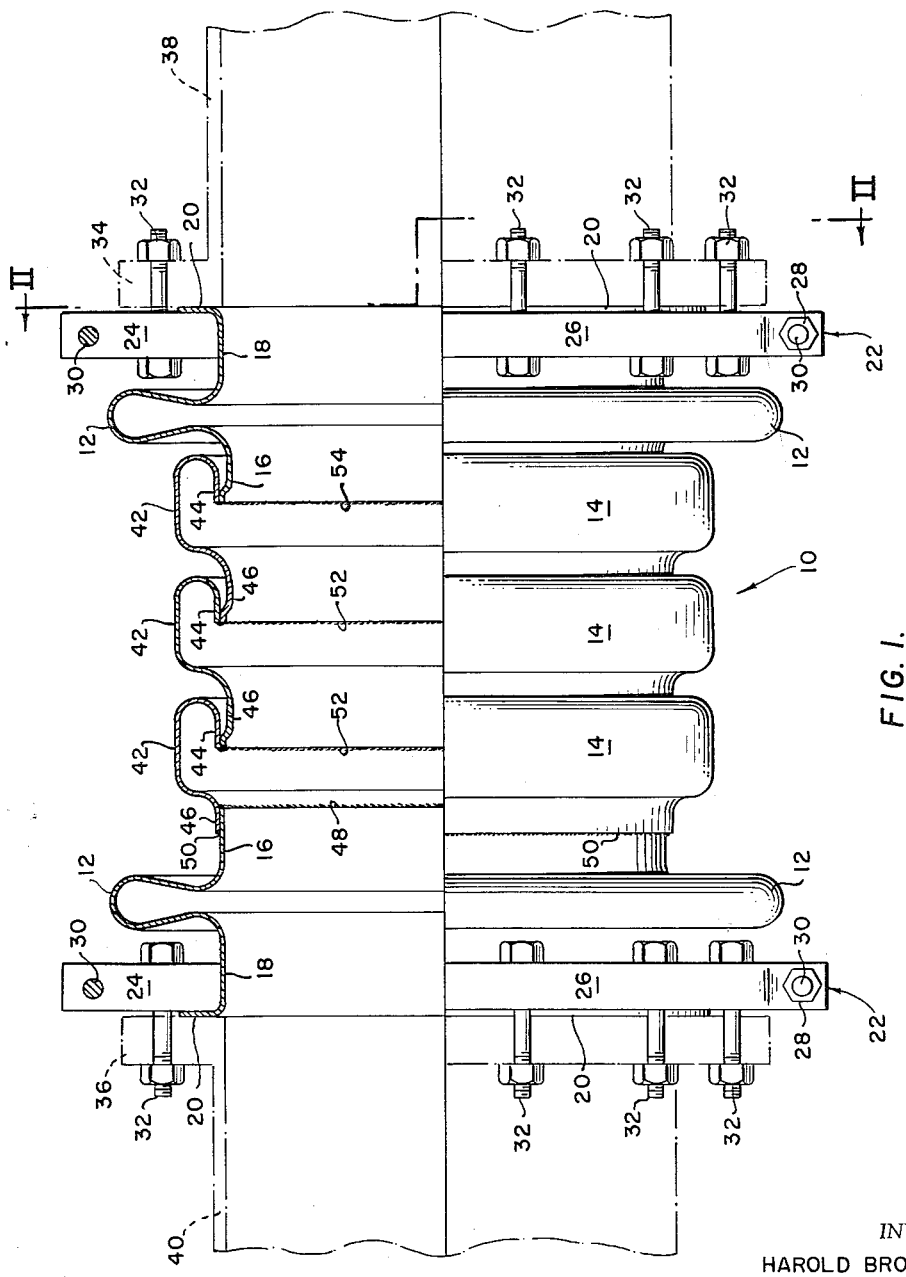
FIG. 1 is an elevational view, partially in section of a pipe coupling constructed in accordance with the instant invention.

2 out the several views, there is shown in FIG. 1 a flexible pipe-line coupling 10 constructed in accordance with the instant invention.

The coupling 10 comprises a pair of spaced annular corrugated members 12 located, for the sake of convenience, at the ends of the coupling 10. The annular corrugated members 12 each has the major axis of its cross-section extending at right angles to the longitudinal axis of the coupling, and they are connected together by a plurality of nested, S-shaped sections 14, each of which has a substantially elliptical cross-section, and a flattened outer surface.

Each of the annular corrugations 12 is provided with an inwardly extending nipple 16 and an outwardly extending nipple 18. Each of the nipples 18 is provided at its free end with an outwardly extending flange 20. The inner face of each of the flanges 20 has in abutment therewith a split, two piece coupling flange 22 composed of semi-circular flange sections 24 and 26 that are held together on the nipple 18 by a nut and bolt arrangement 28 and 30. Each of the flange sections 24 and 26 provided with a plurality of holes extending therethrough and adapted to receive a plurality of bolts 32 that are used for clamping the coupling 22 to a pair of coupling members 34 and 36 on each of a pair of pipe members 38 and 40 that are adapted to be connected together by the instant flexible coupling 10.

Each of the flattened S-shaped corrugations 14 comprises an outer circular flat wall 42 having at one end thereof an inwardly curved flange 44 and at its other end an outwardly curved flange 46, thus in effect each section 14 is provided with an opening in its inner wall. The width of the opening between elements 42 and 44 is approximately one half its length as may be seen by inspecting the drawings. However, this relationship may be varied as long as the junction point of 44 and 46 has room to flex inwardly towards wall 42.

The flattened, S-shaped corrugation 14 nearest the left hand end of FIG. 1 has its outwardly directed flange 46 connected to the nipple 16 on the adjacent corrugation 12 by a pair of weld-joints 48 and 50. The inwardly directed flange 44 on the same corrugation 14 is connected to the outwardly directed flange 46 on the next adjacent corrugation 14 by means of a weld-joint 52. It is emphasized that the same type of connection is made between each outwardly directed flange 46 on a corrugation 14 and the next adjacent inwardly directed flange 44 on the adjacent corrugation 14, as can readily be seen in FIG. 1. The flattened corrugation 14 at the right hand end of the coupling 10 nearest the annular corrugation 12 at the right hand end, is connected to said annular corrugation by a weld-joint 54 connecting the inwardly directed flange 44 on the corrugation 14 to the inwardly directed nipple 16 on the adjacent corrugation 12.

Referring to FIG. 1 in particular, it is emphasized that the structure shown in said figure is adapted to compensate for either separate or combined longitudinal, lateral and angular deflections of the pipes 38 and 40 relative to one another. The longitudinal deflections are absorbed by the annular corrugations 12 and the lateral deflections by the corrugations 14. The corrugations 14 being, by virtue of their design, including the flanges 44 and 46 respectively, particularly adapted for lateral deflection. Any either lateral or angular deflection is absorbed primarily by the bending of the flanges 44 and 46 relative to the outer surface 42 of each corrugation 14. It has been well established that a corrugation such as 12 is adapted largely for longitudinal deflection only and is of little value insofar as lateral deflection is concerned, thus the instant invention provides a coupling adapted to absorb both lateral and longitudinal deflections by the pipes 38 and 40.

Figure 2:
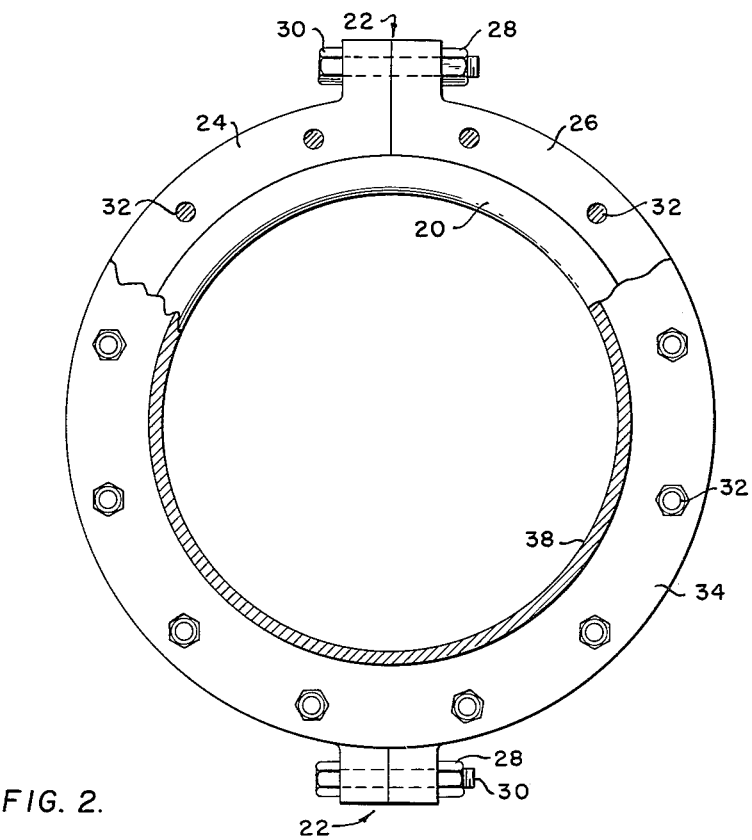
FIG. 2 is an end view, partially broken away and in section, taken on line II—II of FIG. 1.
Figure 3:
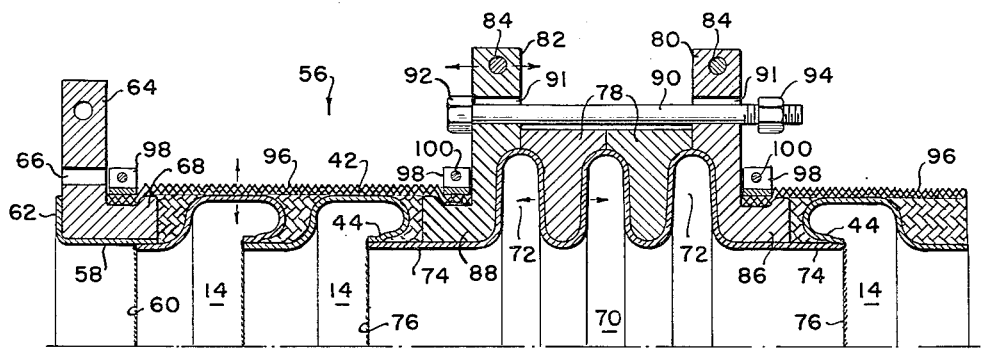
FIG. 3 is a sectional view, partially broken away, of a further embodiment of the instant invention.

Attention is directed to FIG. 3 wherein is shown a modified embodiment of the instant invention. The modified embodiment of the invention shown in FIG. 3 is a combination coupling 56 including, among other elements, a plurality of the S shaped, elliptical cross-sectional corrugations 14 shown in FIG. 1, said corrugations 14 being in the case of the embodiment shown in FIG. 3, utilized adjacent the respective ends of the coupling. The endmost corrugations 14 at each end of the coupling 56 is connected to a nipple 58 by means of a weld-joint 60. The nipple 58 has an outwardly directed flange 62 in abutment with the outer face of a coupling flange 64 which, like the coupling flange 22 shown in FIG. 1, consists of a pair of flange sections of the type shown in FIGS. 1 and 2, and which are connected together by a nut and bolt arrangement such as elements 28 and 30 shown in FIG. 2. It is emphasized that for the sake of convenience, FIG. 3 shows only a portion of the structure, since said structure is symmetrical about a longitudinal axis in much the same manner as the structure shown in FIG. 1.

The coupling flange 64 is also provided with a plurality of bolt receiving holes 66, and an inwardly directed shoulder 68 for purposes hereinafter described. The coupling sections 14 at each end of the coupling 56 are of course adapted to allow for lateral deflection of the coupling in much the same manner as the embodiment shown in FIG. 1.

The embodiment shown in FIG. 3 obtains its longitudinal deflection qualities from a corrugated tube 70 having a plurality of substantially annular corrugations 72. The corrugated tube 70 is provided with an outwardly directed nipple 74 at each end thereof. At each end the nipple 74 is connected to the inwardly turned flange 44 on the nearest torus shaped corrugation 14, by means of a weld-joint 76.

In order to reinforce the annular corrugations 72 against lateral deflection and/or expansion, for which type of deflection they have comparatively little strength, the corrugations 72 are provided with a plurality of external, semicircular, nesting reinforcing bars 78, each having a portion thereof located in the spaces between adjacent corrugations 72 and extending half way over the outer, top portion of each corrugation, in the manner shown in FIG. 3. Each of the endmost of the corrugations 72 is provided with a pair of split flanges 80 and 82. The split flanges 80 and 82 are held together by bolts 84 in much the same manner that the bolts 30 hold together the flange sections 24 and 26 shown in FIGS. 1 and 2. Each of the flange sections 80 and 82 is provided with an outwardly directed shoulder 86 and 88 respectively that is in abutment with the outer surface of the respective nipples 74.

In addition the flanges 80 and 82 are connected together by a plurality of bolts 90 slidably mounted in at least one of the respective flanges 80 and 82, in a radially extending slot 91 in each flange and each has a head 92 at one end and a nut 94 threaded onto the other end. The bolts 90 are hereinafter designated as stop bolts since they prevent excessive longitudinal expansion of the corrugation 72 and at the same time serve to retain the semi-circular reinforcing bars 78 in nesting position about the corrugations 72.

To provide the coupling 56 with resistance against twisting, the S shaped flattened corrugations 14 are surrounded by a braided wire or strip metal mesh 96. Each reinforcing sleeve 96 has one end thereof tightly connected to the shoulder 86 and 88 on the respective flanges 80 and 82 by means of a conventional split clamp ring 98 that is adapted to be tightened by a screw member 100. The other end of each sleeve 96 is clamped by a like clamp ring 98 to the inwardly directed shoulder 68 on each of the flanges 64. The braided sleeves 96 by their inherent nature tend to resist twisting, tending when twisted to tighten about the corrugations 14, thereby providing added reinforcement for said corrugations, and therefore for the coupling 56 as a whole.

Thus it is emphasized, that the instant invention, and more particularly the embodiment shown in FIG. 3 provides a flexible coupling of relatively simple construction and sturdy nature, that is adapted to absorb the effects of either separate or combined lateral, longitudinal and angular deflections of connected pipe members relative to one another whereas prior art flexible coupling devices have largely been adapted to offset the effects of longitudinal deflection only, by using only annular corrugations such as 12 and 72 shown in FIGS. 1 and 3 of the instant case.

It should be understood of course that the foregoing disclosure relates only to preferred embodiments of the instant invention and that numerous modifications or alterations may be made therein without departing from the spirit and scope of the invention as set forth in the appended claims.

What is claimed is:

1. A flexible coupling comprising, a plurality of corrugations connected together to form the longitudinal length of the flexible coupling, at least one of said corrugations being annular and having a cross-section that is symmetrical about an axis extending at right angles to the longitudinal axis of the coupling, and the remainder of said corrugations being substantially S-shaped with the major axis being disposed parallel to the longitudinal axis of the coupling, whereby the flexible coupling is adapted to connect together a pair of tubular members, and to yield to longitudinal, lateral and angular deflections of said tubular members; each of said corrugations having an opening therein exposed to the interior of the coupling, and each of the S-shaped corrugations having a portion thereof comprising a substantially cylindrical outer surface, a first flange extending inwardly from said outer surface toward the interior of the coupling and in juxtaposed relation to the outer surface forming a U-shaped cavity whose width is approximately one-half its length, a second flange extending away from said first flange and forming an ogival curve, the inner leg of said ogival curve extending substantially parallel to the longitudinal axis of the coupling and toward an immediately adjacent S-shaped member, and wherein the second flange of one S-shaped corrugation has a free edge fixedly attached to the free edge on the inwardly directed flange on the next adjacent corrugation, whereby a plurality of nested S-shaped corrugations are formed which are free to flex on substantially all points from one fixedly attached point to the next.

2. A flexible coupling as set forth in claim 1, further characterized by a metal woven sleeve surrounding said S-shaped corrugations and having the strands thereof extending diagonally of the longitudinal axis of the coupling, said sleeve having its opposite ends fixedly attached to the opposite ends of that portion of the coupling including the S-shaped corrugations, to provide a means adapted to resist twisting and lateral expansion of the coupling.

3. A flexible coupling as set forth in claim 1 further characterized as having a pair of spaced, annular corrugations each having a cross-section symmetrical about an axis extending substantially at right angles to the longitudinal axis of the coupling, said annular corrugations being located at the opposite ends of the coupling.

4. A flexible coupling as set forth in claim 1 further characterized as having a plurality of annular metal corrugations each of which has a cross-section symmetrical about an axis extending substantially at right angles to the longitudinal axis of the coupling, and wherein the second flange of one S-shaped corrugation has a free edge fixedly attached by welding to the free edge on the inwardly directed flange on the next adjacent corrugation.

References Cited in the file of this patent

UNITED STATES PATENTS

| | | |
|---|---|---|
| 1,203,602 | Fulton | Nov. 7, 1916 |
| 1,340,818 | Brinkman | May 18, 1920 |
| 2,096,066 | Saforcada | Oct. 19, 1937 |
| 2,445,484 | Kopperman | July 20, 1948 |
| 2,568,923 | McNeary | Sept. 25, 1951 |
| 2,657,074 | Schwester | Oct. 27, 1953 |
| 2,865,403 | Le Vantine | Dec. 23, 1958 |
| 2,886,066 | Hansen | May 12, 1959 |
| 2,893,431 | Bowditch | July 7, 1959 |